(12) United States Patent
Robere et al.

(10) Patent No.: US 11,047,439 B2
(45) Date of Patent: Jun. 29, 2021

(54) INTELLIGENT BRAKE SYSTEM HEALTH MONITORING

(71) Applicant: GM Global Technology Operations LLC, Detroit, MI (US)

(72) Inventors: Matthew A. Robere, Novi, MI (US); Ali Shabbir, Mississauga (CA); Steven J. Weber, Mount Clemens, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 183 days.

(21) Appl. No.: 16/255,177

(22) Filed: Jan. 23, 2019

(65) Prior Publication Data

US 2020/0232531 A1 Jul. 23, 2020

(51) Int. Cl.
*F16D 66/00* (2006.01)
*F16D 55/225* (2006.01)

(52) U.S. Cl.
CPC ............ *F16D 66/00* (2013.01); *F16D 55/225* (2013.01); *F16D 2066/001* (2013.01); *F16D 2066/005* (2013.01)

(58) Field of Classification Search
CPC .. F16D 66/00; F16D 55/225; F16D 2066/001; F16D 2066/005; F16D 2066/006
See application file for complete search history.

(56) References Cited

U.S. PATENT DOCUMENTS

| | | | |
|---|---|---|---|
| 10,773,702 B2* | 9/2020 | Ohazulike | G07C 5/008 |
| 2009/0134698 A1* | 5/2009 | Herges | B60T 8/1766 |
| | | | 303/113.2 |
| 2011/0054758 A1* | 3/2011 | Bae | B60T 8/175 |
| | | | 701/92 |
| 2015/0356635 A1* | 12/2015 | Thurston | B60Q 9/00 |
| | | | 705/306 |
| 2018/0037210 A1* | 2/2018 | Hecker | G07C 5/0808 |
| 2018/0251103 A1* | 9/2018 | Satterthwaite | B60L 3/0076 |
| 2019/0101175 A1* | 4/2019 | Chandrasekara | G01L 5/28 |
| 2019/0217671 A1* | 7/2019 | Bates | F16D 66/021 |
| 2019/0351889 A1* | 11/2019 | Serra | B60R 16/033 |
| 2019/0381987 A1* | 12/2019 | Michels | F16D 66/021 |

* cited by examiner

*Primary Examiner* — Dale W Hilgendorf
*Assistant Examiner* — Alexander C. Bost
(74) *Attorney, Agent, or Firm* — Cantor Colburn LLP

(57) ABSTRACT

A method of monitoring a brake corner of a vehicle including that real-time brake corner temperature data of the brake corner is detected, real-time brake corner pressure data of the brake corner is detected, and real-time brake corner torque data of the brake corner is detected. The method further includes that a brake drag or a brake pulsation is determined in response to the braking energy of the brake corner, whether the brake pedal of the vehicle is applied, and at least one of the real-time brake corner pressure data of the brake corner and the real-time brake corner torque data of the brake corner.

5 Claims, 7 Drawing Sheets

INTELLIGENT BRAKE SYSTEM HEALTH MONITORING

INTRODUCTION

The subject disclosure relates to vehicles, and more particularly relates to methods and systems for monitoring brake corners of a vehicle.

Brake pad life monitoring has been implemented on vehicles in various ways. Some vehicles have mechanical sensors that provide an audible sound when the brake pad wears sufficiently that the sensor contacts the brake rotor. Some vehicles have an electronic sensor that provides a one-time signal when brake pad wear reaches a predetermined amount of wear, and may indicate this to a vehicle operator as a percentage remaining brake pad life in a vehicle information center accessible on the dash board or steering wheel. A more advanced wear life algorithm estimates brake pad wear based on an estimated rotor temperature correlated with typical driving conditions requiring relatively low braking energy. If the vehicle is self-driving, manual inspection by a human being may not be attainable for a certain period of time.

Accordingly, it is desirable to provide methods and system for monitoring brake pad life with increased accuracy, as well as monitor other potential brake system failure modes for predictive purposes.

SUMMARY

In one exemplary embodiment, a method of monitoring a brake corner of a vehicle is provided. The method includes that real-time brake corner temperature data of the brake corner is detected, real-time brake corner pressure data of the brake corner is detected, and real-time brake corner torque data of the brake corner is detected. The method further includes that a brake drag or a brake pulsation is determined in response to the braking energy of the brake corner, whether the brake pedal of the vehicle is applied, and at least one of the real-time brake corner pressure data of the brake corner and the real-time brake corner torque data of the brake corner.

In addition to one or more of the features described herein, or as an alternative, further embodiments may include that an alert is activated when the brake drag exceeds a brake drag exceedance limit.

In addition to one or more of the features described herein, or as an alternative, further embodiments may include that the sampling rate of at least one of the real-time brake corner temperature data, the real-time brake corner pressure data, and the real-time brake corner torque data is increased when the brake drag exceeds a brake drag exceedance limit.

In addition to one or more of the features described herein, or as an alternative, further embodiments may include that an alert is activated when the brake pulsation exceeds a brake pulsation exceedance limit.

In addition to one or more of the features described herein, or as an alternative, further embodiments may include that the sampling rate of at least one of the real-time brake corner temperature data, the real-time brake corner pressure data, and the real-time brake corner torque data is increased when the brake pulsation exceeds a brake pulsation exceedance limit.

In addition to one or more of the features described herein, or as an alternative, further embodiments may include that determining the braking energy of the brake corner in response to the real-time brake corner temperature data of the brake corner further includes that the braking energy is determined in response to deceleration parameters of the vehicle. Additionally, determining a braking energy of the brake corner in response to the real-time brake corner temperature data of the brake corner may also include that the braking energy is adjusted in response to aerodynamic losses of the vehicle and the braking energy is adjusted in response to the real-time brake corner temperature data.

In one exemplary embodiment, a method of monitoring a brake corner of a vehicle is provided. The method including that real-time brake corner temperature data of the brake corner is detected, real-time brake corner pressure data of the brake corner is detected, and real-time brake corner torque data of the brake corner is detected. The method may also include that an estimated brake clamp force is determined in response to at least one of the real-time brake corner temperature data, the real-time brake corner pressure data, and the real-time brake corner torque data.

In addition to one or more of the features described herein, or as an alternative, further embodiments may include that the brake corner is clamped using the estimated brake clamp force.

In addition to one or more of the features described herein, or as an alternative, further embodiments may include that after the brake corner has been clamped, the method further includes that the real-time brake corner temperature data of the brake corner is detected, the real-time brake corner pressure data of the brake corner is detected, and the real-time brake corner torque data of the brake corner is detected.

In addition to one or more of the features described herein, or as an alternative, further embodiments may include that it is determined whether a re-clamp is required in response to at least one of the real-time brake corner temperature data, the real-time brake corner pressure data, and the real-time brake corner torque data.

In addition to one or more of the features described herein, or as an alternative, further embodiments may include that a second estimated brake clamp force is determined in response to at least one of the real-time brake corner temperature data, the real-time brake corner pressure data, and the real-time brake corner torque data when the re-clamp is required. The method may further include that the brake corner is re-clamped using the estimated brake clamp force.

In addition to one or more of the features described herein, or as an alternative, further embodiments may include that determining an estimated brake clamp force in response to at least one of the real-time brake corner temperature data, the real-time brake corner pressure data, and the real-time brake corner torque data further includes that it is determined that a re-clamp is required after a time period in response to the real-time brake corner temperature, the estimated brake clamp force, and cooling coefficients of the brake corner.

In one exemplary embodiment, a method of monitoring a brake corner of a vehicle is provided. The method including that real-time brake corner temperature data of the brake corner is detected and real-time brake corner pressure data of the brake corner is detected. The method may also include a stiffness of a brake pad of the brake corner in response to at least one of the real-time brake corner temperature data and the real-time brake corner pressure data. The method may further include that wear of the brake pad is determined in response to the stiffness of the brake pad.

In addition to one or more of the features described herein, or as an alternative, further embodiments may include that an alert when the wear of the brake pad exceeds a brake pad wear exceedance limit is activated.

In addition to one or more of the features described herein, or as an alternative, further embodiments may include that the sampling rate of at least one of the real-time brake corner temperature data and the real-time brake corner pressure data is increased when the wear of the brake pad exceeds a brake pad wear exceedance limit.

In addition to one or more of the features described herein, or as an alternative, further embodiments may include that determining a stiffness of a brake pad of the brake corner in response to at least one of the real-time brake corner temperature data and the real-time brake corner pressure data further includes that braking energy of the brake corner is determined in response to the real-time brake corner temperature data of the brake corner.

In addition to one or more of the features described herein, or as an alternative, further embodiments may include that determining the braking energy of the brake corner in response to the real-time brake corner temperature data of the brake corner further includes that the braking energy is determined in response to deceleration parameters of the vehicle and braking energy is adjusted in response to aerodynamic losses of the vehicle and the real-time brake corner temperature data.

In addition to one or more of the features described herein, or as an alternative, further embodiments may include that determining a stiffness of a brake pad of the brake corner in response to at least one of the real-time brake corner temperature data and the real-time brake corner pressure data further includes that the vehicle is determined to be in motion and a stiffness of multiple brake pads of the vehicle is determined when the vehicle is in motion. The method may also include that the vehicle is determined to be parked and a stiffness of at least one of the multiple brake pads that is located on an axle of the vehicle having a parking brake is determined when the vehicle is parked. The method may further include that the stiffness of the at least one of the multiple brake pads located on the axle of the vehicle having the parking brake is subtracted from the stiffness of multiple brake pads.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
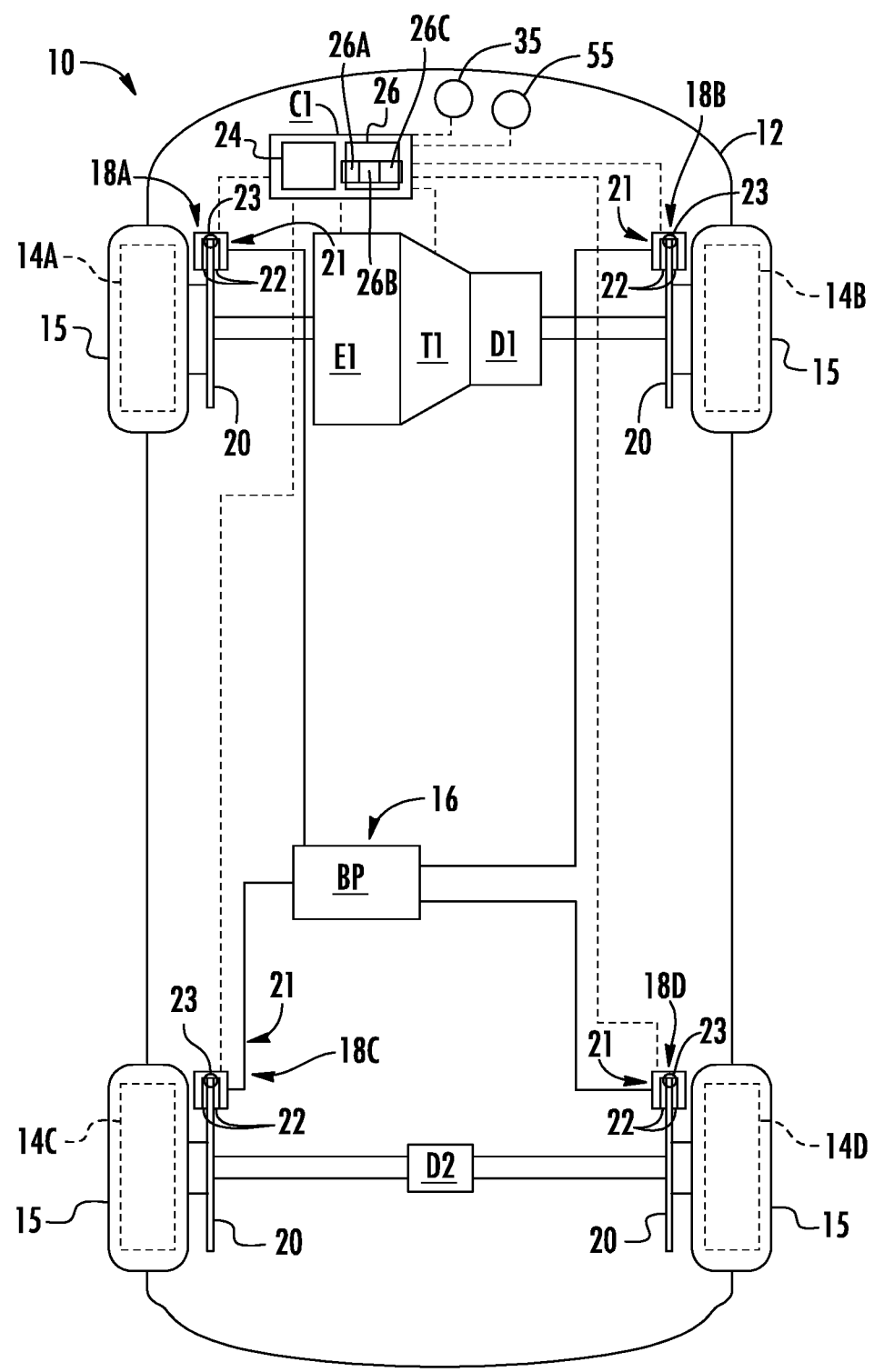
FIG. 1 is a block diagram of a system for monitoring brake corner data, according to an embodiment of the present disclosure.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, exemplary embodiments may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that exemplary embodiments may be practiced in conjunction with any number of control systems, and that the vehicle systems described herein are merely exemplary embodiments.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in various embodiments.

Referring now to FIG. 1, a vehicle 10 that has a vehicle body 12 that is operatively connected to rotatable wheels 14A, 14B, 14C, 14D for moving the vehicle body 12 when propelled by an engine E1 via a transmission T1. It is understood that the embodiments disclosed herein are not limited to a vehicle 12 propelled by an engine E1 (e.g., an internal combustion engine), thus the embodiments disclosed herein may also be applicable to other vehicles including but not limited to electric vehicles propelled entirely and/or partially by an electric motor. In one non-limiting example, the vehicle 10 is a front wheel-drive vehicle. Differential D1 operatively connects the front wheels 14A, 14B, and a differential D2 operatively connects the rear wheels 14C, 14D via half shafts as is known. Tires 15 are shown mounted on the wheels 14A, 14B, 14C, 14D. The vehicle 10 includes a braking system 16 that is configured to stop rotation of the wheels 14A, 14B, 14C, 14D. The braking system 16 includes a fluid pressure source BP in communication with respective braking mechanism 18A, 18B, 18C, 18D operatively connected with each respective wheel 14A, 14B, 14C, 14D. The braking mechanisms 18A, 18B, 18C, 18D each have a brake rotor 20 rotatable with the respective wheel 14A, 14B, 14C, 14D, and respective brake pads 22 placed in contact with opposite sides of the brake rotor 20 during braking. The brake pads 22 and brake rotor 20 form a brake corner 21.

Each brake corner 21 includes a sensor 23 configured to measure real-time brake corner pressure, real-time brake corner temperature, and real-time brake corner torque. This sensor 23 may exist on the brake pad 22, or elsewhere within the brake corner 21. The real-time brake corner temperature may be measured between a lining of the brake pad 22 and a back plate of the brake pad 22. The sensor 23 may utilize three separate sensors, such as, for example two piezoelectric sensors to detect a change in voltage to detect real-time brake corner pressure and real-time brake corner torque of the brake pad 22 and one thermocouple sensor to measure real-time brake corner temperature.

An electronic controller C1 has a processor 24 that executes a stored algorithm 26 for determining a state of health of the brake corners 21, including but not limited to a drag of the brake pads 22, a pulsation rate of the brake corners 21, an electronic park brake re-clamp requirement, and a remaining life of the brake pad 22. The algorithm 26 may include a first algorithm 26a for determining drag of the brake corners 21 and the pulsation rate of the brake corners 21, a second algorithm 26b for determining re-clamp of a parking brake corner 21, and a third algorithm 26c for determining a remaining life of the brake pad 22.

Figure 2:
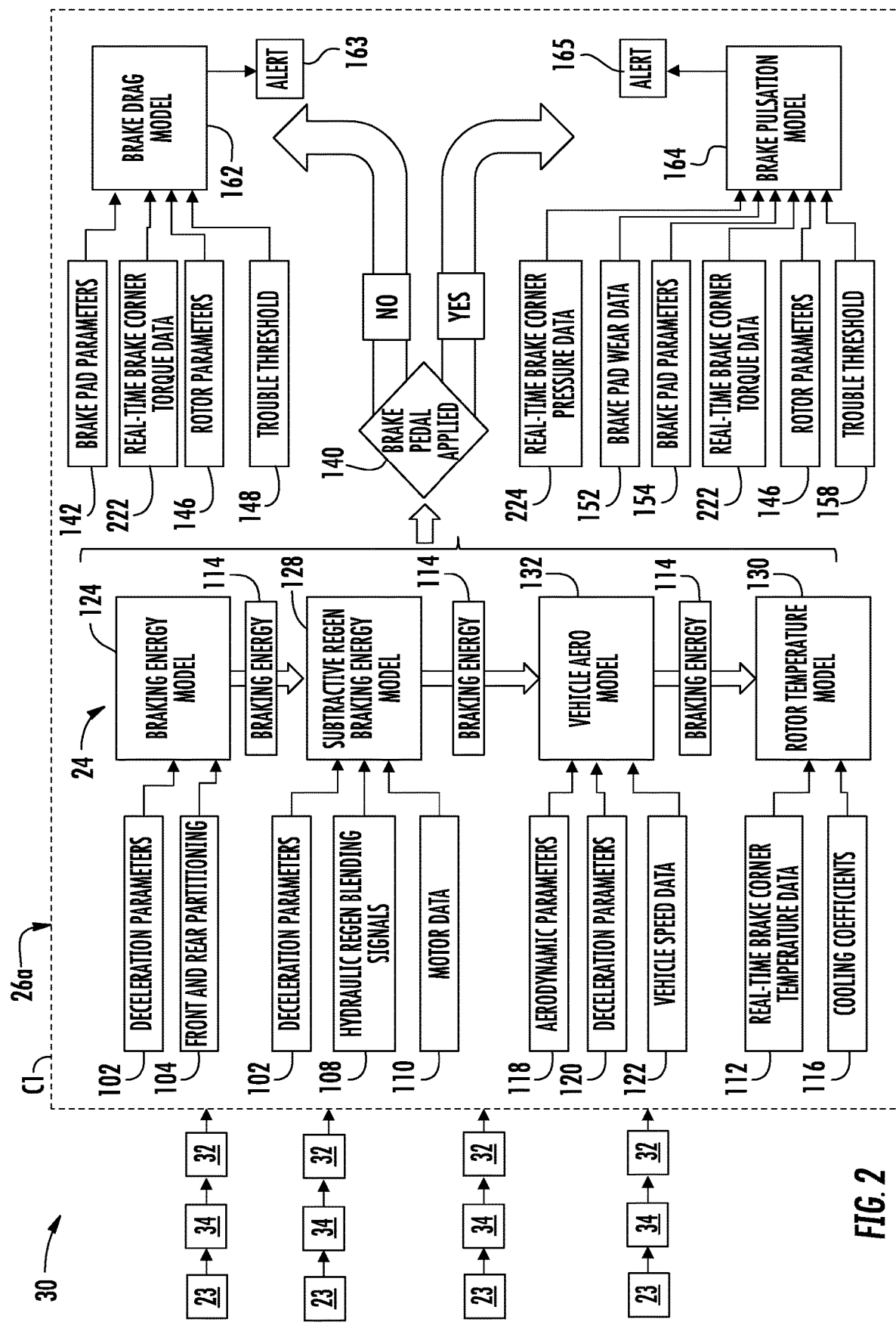
FIG. 2 is a block chart diagram illustrating a first algorithm of determining drag of the brake pads and the pulsation rate of the brake pads, according to an embodiment of the present disclosure.

Referring to FIG. 2, with continued reference to FIG. 1, a system 30 for determining drag of the brake corners 21 and the pulsation rate of the brake corners 21 is illustrated, in accordance with an embodiment of the present disclosure. The system 30 on the vehicle 10 includes various vehicle sensors 32, and includes the controller C1 that receives input signals from the sensors 32 so that the processor 24 can carry out the first algorithm 26a, represented as various modules each modeling aspects of the vehicle operation based on the sensor inputs, to produce an alert 163, 165 in a brake corner state of health output device 35, such as an operator display device or an audio signal. Although only four sensors 32 are depicted, many more sensors may be included in the system 30. The sensors 32 may include wheel speed sensors, brake fluid pressure sensors, and other sensors and the input from the sensors 32 may include wheel speeds, vehicle speed, longitudinal acceleration, dynamic brake proportioning, brake apply, vehicle grade, brake temperature (brake pad, or brake fluid), brake apply sensor (BAS), steering wheel input, and brake pad life status signal (a voltage reading from a wearout sensor with a resistive circuit). Additionally, the sensor 23 of the brake corner 21 also provides data to the controller C1. Various systems 34 may provide input signals, including vehicle systems and offboard systems, such as telematics systems, global positioning systems, and map information. Based on the input from the sensors 32 and systems 34, the controller C1 can estimate or calculate vehicle mass, road grade, amount of engine braking, braking energy, rolling resistance, appropriate rotor cooling coefficients, lateral and longitudinal acceleration, and other vehicle operating characteristics as described herein.

It should be appreciated that the electronic controller C1 may be configured as a single or a distributed control device that is electrically connected to or otherwise placed in hard-wired or wireless communication with the engine E1 or electric motors (for BEV/Hybrid), the transmission T1, the braking system 16, and various vehicle components, including sensors, for transmitting and receiving electrical signals for proper execution of the first algorithm 26a.

The electronic controller C1 includes one or more control modules, with one or more processors 24 and tangible, non-transitory memory, e.g., read-only memory (ROM), whether optical, magnetic, flash, or otherwise. The electronic controller C1 may also include sufficient amounts of random access memory (RAM), electrically-erasable programmable read-only memory (EEPROM), and the like, as well as a high-speed clock, analog-to-digital (A/D) and digital-to-analog (D/A) circuitry, and input/output circuitry and devices (I/O), as well as appropriate signal conditioning and buffer circuitry.

The electronic controller C1 can be a host machine or a distributed system, e.g., a computer such as a digital computer or microcomputer, acting as a vehicle control module, and/or as a proportional-integral-derivative (PID) controller device having a processor, and, as the memory, tangible, non-transitory computer-readable memory such as read-only memory (ROM) or flash memory. Therefore, the controller C1 can include all software, hardware, memory, algorithms, connections, sensors, etc., necessary to monitor the vehicle 10 and control the system 30. As such, one or more control methods executed by the controller C1 can be embodied as software or firmware associated with the controller C1. It is to be appreciated that the controller C1 can also include any device capable of analyzing data from various sensors, comparing data, and making decisions required to monitor brake pad wear and alert the vehicle operator of brake pad life. Moreover, the electronic controller C1 can be configured in different embodiments to include a brake controller, a powertrain controller, and other controllers onboard or offboard the vehicle 10.

The first algorithm 26a begins by determining braking energy 114 according to a braking energy model 124. The calculated braking energy 114 used in the rotor temperature model 130 is an estimate of the braking energy dissipation in the braking mechanisms 18A, 18B, 18C, 18D. This calculation uses various inputs, such as stopping distance, stopping time, brake pad temperature, etc. The master cylinder pressure of the braking system 16, the weight distribution in the vehicle 10 and the dynamic brake proportioning for the proportional brake pressure at each wheel 14A-14D can be used to determine the brake pressure. The front and rear brake partitioning 104 is based on where the weight in the vehicle 10 is distributed, and is a known calculation. Vehicle mass can be estimated based on engine torque, and is a process well known to those skilled in the art. The mass of the vehicle 10 may change as a result of the number of passengers, load in the trunk, fuel capacity, etc. Further, those skilled in the art understand various ways to estimate the road grade in combination with the estimation of the vehicle mass.

The processor 24 can calculate the braking energy 114 for use in the rotor temperature model 130 by Equation (1) below. The braking energy 114 is the work done by the braking mechanisms 18A-18D to decelerate the vehicle 10, and is the total work minus the rolling resistance, the aerodynamic drag, the engine braking and the road grade. The brake work can be used to calculate the power dissipated by the braking mechanisms 18A, 18B, 18C, 18D, where power equals work per unit of time. The power can be calculated at predetermined time intervals during the braking event, for example, every 10 milliseconds.

$$\text{Braking Energy} = \frac{1}{2}M(V_I^2 - V_F^2) - E_{Rolling\ Resistance} - E_{Grade} - E_{Engine} \quad (1)$$

In Equation (1), M is the mass of the vehicle; $E_{Rolling\ Resistance}$ is the energy required to roll the vehicle 10 on a flat grade, which is a known value; $E_{Grade}$ is the energy required to roll the vehicle 10 as a result of the grade of the road, which is also a known value; $E_{Engine}$ is the braking provided by the engine E1 itself, and is also a known value; $V_1$ is the velocity of the vehicle 10 at the beginning of the braking event; and $V_F$ is the velocity of the vehicle 10 at the end of the braking event. In an alternate embodiment, vehicle 10 deceleration parameters 102 can be used instead of the vehicle speed V, and can be provided by a longitudinal acceleration sensor.

The total braking power dissipated by each brake corner 21 during the braking event can also be estimated as the product of braking force and vehicle velocity. Braking torque can be calculated as:

$$\text{Braking Torque} = \text{brake pressure} \times \text{area} \times \mu \quad (2)$$

Where $\mu$ is the friction coefficient of the brake pad 22, which is a function of the pad temperature, and area is the area of the hydraulic piston(s) in the brake corner 21. Braking energy may be an average braking power multiplied by stopping time. Alternately, the braking power can be calculated as:

$$\text{Braking Power} = \left(\frac{\text{Torque}}{\text{Rolling Radius}}\right) * \text{Velocity} \quad (3)$$

The torque is calculated for both the front and the rear of the vehicle 10 and is a function of the brake pressure and the front and rear brake partitioning 104. The Rolling Radius is the rolling radius of the wheel 14A, 14B, 14C, or 14D, and velocity is the vehicle velocity.

The processor 24 can then adjust the braking energy 114 for use in the vehicle aero model 132 using the subtractive regen braking energy model 128. The subtractive regen braking energy model 128 adjusts the braking energy 114 in response to motor data 110, hydraulic regen blending signals 108, and deceleration parameters 102. The subtractive regen braking energy 128 model is utilized for hybrid or battery electric vehicles due to regenerative braking energy that is generated during a braking event. This energy contributes to the overall stopping energy of the vehicle and is a separate system that has no physical effect on the hardware at the brake corner 21 (i.e., the rotors, calipers, brake pads, etc). Regen braking takes some "load" off of the friction brake corners 21. The subtractive regen braking energy model 128 can be refined with inputs from the regen braking system, to see how much energy should be "subtracted". If the hydraulic pressure at the brake corner 21 is known, the friction braking energy is directly calculable.

After braking energy 114 is adjusted by the subtractive regen braking energy model, the first algorithm 26a then proceeds to the vehicle aero model 132. The vehicle aero model 132 is configured to determine aerodynamic losses in response to aerodynamic parameters 118, deceleration parameters 120, and vehicle speed data 122.

The vehicle speed data 122 is used to determine the amount of energy dissipated by aerodynamic drag on the vehicle 10. First, the aerodynamic force on the vehicle 10 is determined as follows:

$$\text{Aero Force} = \frac{1}{2}C_d \times \rho \times A \times V^2 \quad (4)$$

where $C_d$ is the aerodynamic drag coefficient, $\rho$ is air density, A is the vehicle cross sectional area, and V is vehicle velocity. The aerodynamic drag coefficient $C_d$, air density $\rho$, and vehicle cross sectional area A may be constants stored in the processor 24. Alternatively, air density $\rho$ can be varied according to a sensed air temperature.

The aerodynamic losses are then subtracted from the braking energy 114. The braking energy 114 can be calculated as change in vehicle kinetic energy minus powertrain losses from the braking energy model 124 and the subtractive regen braking energy model 128 and minus aero effects from the vehicle aero model 132. The resultant braking energy 114 may then be used to calculate the rotor temperature model 130.

The first algorithm 26a determines rotor temperature according to a rotor temperature model 130. The real-time brake corner temperature data 112 is measured at a certain offset from the rotor 20 (e.g., this may be a brake pad lining thickness if measured behind the liner), and as such requires a small thermal calculation to take place in order to determine the true temperature on the rotor 20. If the sensor 23 is using a thermocouple embedded in the brake pad 22 to detect real-time brake corner temperature data 112, the detected real-time brake corner temperature data 112 is correlated to the thickness of the lining and the cooling effects between the rotor 20 and brake pad 22 interface, which is subject to speed of vehicle 10 and aero coefficients. Thus, the real-time brake corner temperature data 112 may not be the actual temperature of the rotor 20, but rather may be less than the actual temperature of the rotor 20.

The rotor temperature model 130 utilizes real-time brake corner temperature data 112 and the braking energy 114 determined by the braking energy model 124 and adjusted by the subtractive regen braking energy model 128 and the vehicle aero model 132. As discussed above, the sensor 23 within the brake corner 21 detects in real-time the temperature of the brake corner 21. The rotor temperature model 130 also factors into account a first set of cooling coefficients 116 for a thermal temperature model of the brake pads 22. The calculated braking energy 114 and cooling coefficients 116 are appropriate (i.e., substantially accurate) for vehicle operating conditions with relatively low energy braking, typical of standard driving conditions. Accordingly, the first rotor temperature model 130 utilizes a calculated braking energy 114 and an equation for heat transfer from each rotor 20 that utilizes cooling coefficients 116 selected to correlate with the standard driving conditions.

The cooling rate of the rotors 20 is dependent on the mass of the rotor 20, vehicle design, vehicle speed, wheel speed, ambient temperature, altitude, etc. As the vehicle 10 moves, the air flowing around each rotor 20 will determine how fast it is cooled from the previous braking event. The cooling coefficients 116 used in the lumped capacitance model of temperature decay (Equation 5) are selected to be correlated with relatively standard driving conditions with rotor temperature below a predetermined rotor temperature, vehicle speed below a predetermined vehicle speed, and braking energy below a predetermined braking energy.

The lumped capacitance model for brake rotor cooling is as follows:

$$\frac{dT}{dt} = -b(T - T_a) + D(1) \quad (5)$$

$$D = \frac{P_d}{\rho V_c} \quad (6)$$

where $P_d$ is brake residual drag, $\rho$ is the density of the rotor material, V is the volume of the rotor material, and c is the specific heat capacity of the rotor material. The term b is the "cooling coefficient" and is equal to:

$$\frac{hA}{\rho V_c} \quad (7)$$

where h is the convective heat transfer coefficient and A is the working area (exposed to convective cooling airflow). Cooling coefficients are measured in vehicle tests by recording the cooling rate of the brake rotors and fitting the lumped capacitance model to the recorded data. Cooling coefficients vary approximately linearly with vehicle speed. Cooling coefficients may be measured at discrete speeds, and may then a linear model may be fit to the data to determine cooling coefficients at any speed. Typical cooling coefficient values will vary by brake rotor design and vehicle environment. An example cooling coefficient versus vehicle speed relationship could be:

$$b = 0.00033V + 0.0033 \quad (8)$$

where V is the vehicle forward velocity in kilometers per hour.

This information determined by the models 124, 128, 132, 130 is used to help determine trouble zones for drag by the brake drag model 162 and brake pulsation by the brake pulsation model 164. For instance, a standard threshold for brake drag may be about 10 Nm, however if high braking energy 114 that would constitute a damaging use case scenario is detected then the first algorithm 26a could increase the sampling frequency, to quickly capture damage that may have occurred leading to high drag during that event.

At block 140, the first algorithm 26a checks whether the brake pedal is not applied and then moves to either the brake drag model 162 or the brake pulsation model 164. If the brake pedal is applied at 140 then the first algorithm 26a moves to the brake drag model 162. The brake drag model 162 determines whether the brake drag is above a trouble threshold 148 in response to brake pad parameters 142, real-time brake corner torque data 222, and rotor parameters 146. The brake pad parameters may include, but are not limited to, a coefficient of thermal expansion. For instance, the coefficient of thermal expansion of the brake pad may indicate that above a specific temperature, the potential for brake drag may increase beyond a trouble threshold 148, thus sampling of the sensor 23 must increase in frequency or an action taken if a trouble threshold is exceeded. The rotor parameters 146 may include, but are not limited to, the coefficient of thermal expansion of the brake rotor 20. The trouble threshold 148 may be a brake drag exceedance limit that activates an alert 163 when exceeded. The trouble threshold 148 would be vehicle specific, and based upon the desired goals and performance of the vehicle 10. For instance, if a given vehicle is sensitive to tactile brake pulsation occurring when brake torque variation exceeds 75 Nm, than the trouble threshold 148 may be set to 75 Nm. A different vehicle may not be sensitive up until 150 Nm. Similarly for drag, a high performance internal combustion engine vehicle may have a higher trouble threshold than a battery electric vehicle.

The brake drag being above a selected threshold is indicative that the brake pad 22 is unintentionaly impacting the brake rotor 20. The brake drag model 162 is configured to activate an alert 163 if the brake drag is above a selected threshold. The alert 163 may be delivered via the brake pad state of health output device 35. The alert 163 may be a message to the driver via an instrument cluster message, center stack message, or telltale indicator light. In the case of autonomous driving the alert 163 may trigger an automatic service check. Advantageously, detecting abnormal brake drag may help eliminate parasitic drag on the vehicle 10, thus improving fuel economy. Also, advantageously, detecting abnormal brake drag may help with early detection of mechanical failure related to specific hardware associated with brake pads 22, such as, for example, caliper pin, seal, brake wear-out.

If the brake pedal is applied at 140 then the first algorithm 26a moves to the brake pulsation model 164. The brake pulsation model 164 determines whether the brake pulsation is above a trouble threshold 158 in response to real-time brake pressure date 224, brake pad wear data 152, brake pad parameters 154, real-time brake corner torque data 222, rotor parameters 146, and trouble threshold 158. The brake pad wear data 152 is an output of the linear pad wear model 350 later discussed in relation to FIG. 6. The brake pad parameters may include but are not limited to Young's modulus (i.e., compressibility of the lining), which may in turn impact the sensitivity to pulsation, and the trouble threshold 158. The trouble threshold 158 may be a brake pulsation exceedance limit that activates an alert 165 when exceeded. The trouble threshold 158 would be vehicle specific, and based upon the desired goals and performance of the vehicle 10.

The brake pulsation being above a selected threshold is indicative that the brake corner 21 is pulsating excessively. The brake pulsation model 164 is configured to activate an alert 165 if the brake pulsation is above a selected threshold. The alert 165 may be delivered via the brake state of health output device 35. The alert 165 may be a message to the driver via an instrument cluster message, center stack message, or telltale indicator light. In the case of autonomous driving the alert 165 may trigger an automatic service check. Advantageously, detecting abnormal brake pulsation could help eliminate tactile pulsation viewed as uncomfortable to the driver or passengers. Also, advantageously, detecting abnormal brake pulsation could help with early detection of mechanical failure related to specific hardware associated with brake components, such as, for example a warped rotor or non-uniformly ground brake pads 22.

Figure 3:
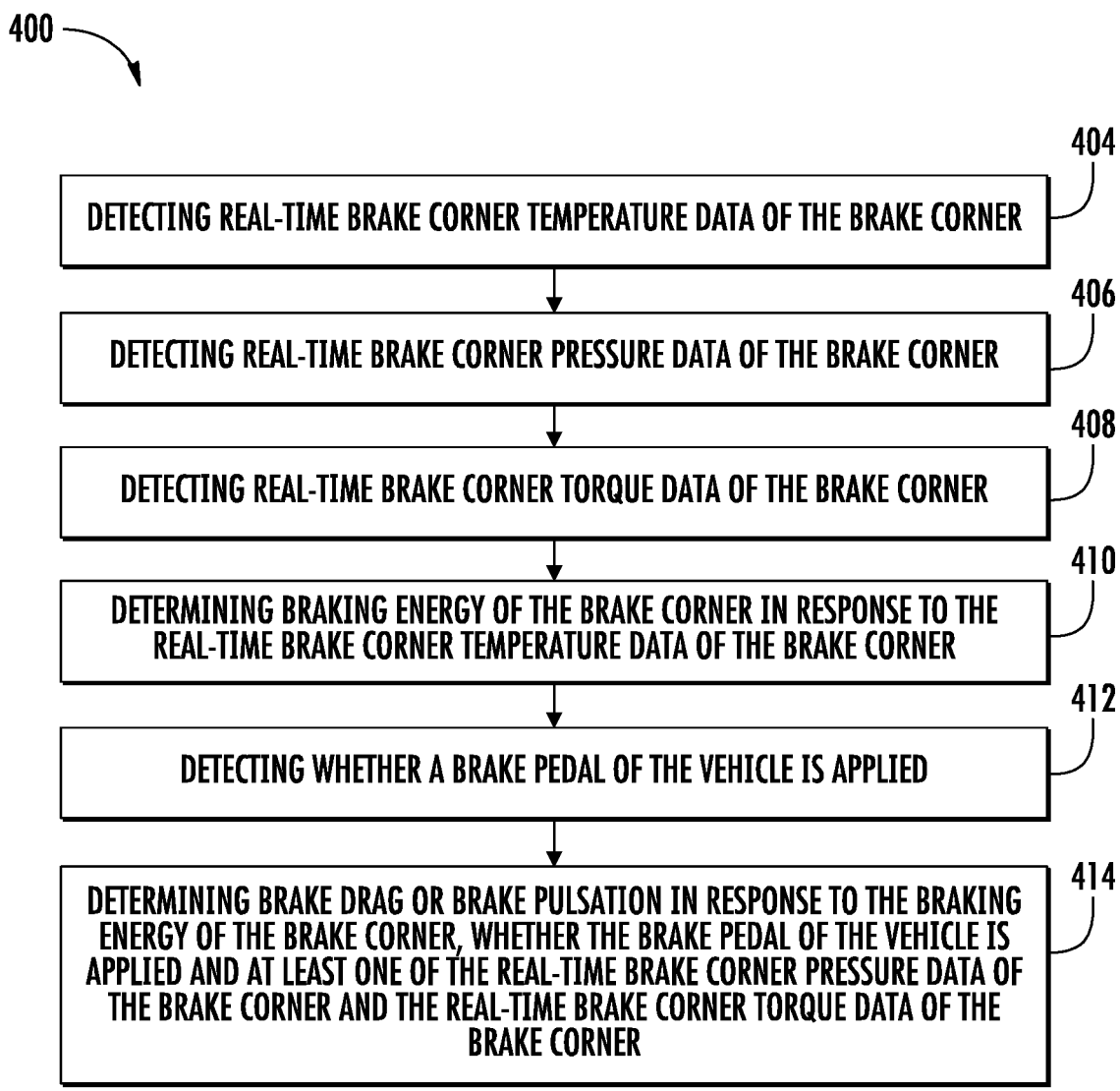
FIG. 3 is a flow diagram illustrating a method of monitoring brake pads to determine drag of the brake pads and the pulsation rate of the brake pads, according to an embodiment of the present disclosure.

Referring to FIG. 3, with continued reference to FIGS. 1 and 2, a flow chart is illustrated of a method 400 of monitoring brake corners 21 of a vehicle 10, according to an embodiment of the present disclosure. In an embodiment, the method 400 is performed by the controller C1.

At block 404, real-time brake corner temperature data 112 of the brake corner 21 is detected. At block 406, real-time brake corner pressure data 224 of the brake corner 21 is detected. At block 408, real-time brake corner torque data 222 of the brake corner 21 is detected. At block 410, braking energy 114 of the brake corner 21 is determined in response to the real-time brake corner temperature data 112 of the brake corner 21. The braking energy 114 of the brake corner 21 may be determined in response to deceleration parameters of the vehicle and then adjusted in response to aerodynamic losses of the vehicle and/or real-time brake corner temperature data 112.

At block 412, it is detected whether a brake pedal of the vehicle 10 is applied. At block 414, a brake drag or a brake pulsation is determined in response to the braking energy 114 of the brake corner 21, whether the brake pedal of the vehicle 10 is applied and at least one of the real-time brake corner pressure data 224 of the brake corner 21 and the real-time brake corner torque data 222 of the brake corner 21.

An alert 163 may be activated when the brake drag exceeds a brake drag exceedance limit. The sampling rate may be increased of at least one of the real-time brake corner temperature data 112, the real-time brake corner pressure data 224, and the real-time brake corner torque data 222 when the brake drag exceeds a brake drag exceedance limit. An alert 165 when the brake pulsation exceeds a brake pulsation exceedance limit. The sampling rate may be increased of at least one of the real-time brake corner temperature data 112, the real-time brake corner pressure data 224, and the real-time brake corner torque data 222 when the brake pulsation exceeds a brake pulsation exceedance limit.

While the above description has described the flow process of FIG. 3 in a particular order, it should be appreciated that unless otherwise specifically required in the attached claims that the ordering of the steps may be varied.

Figure 4:
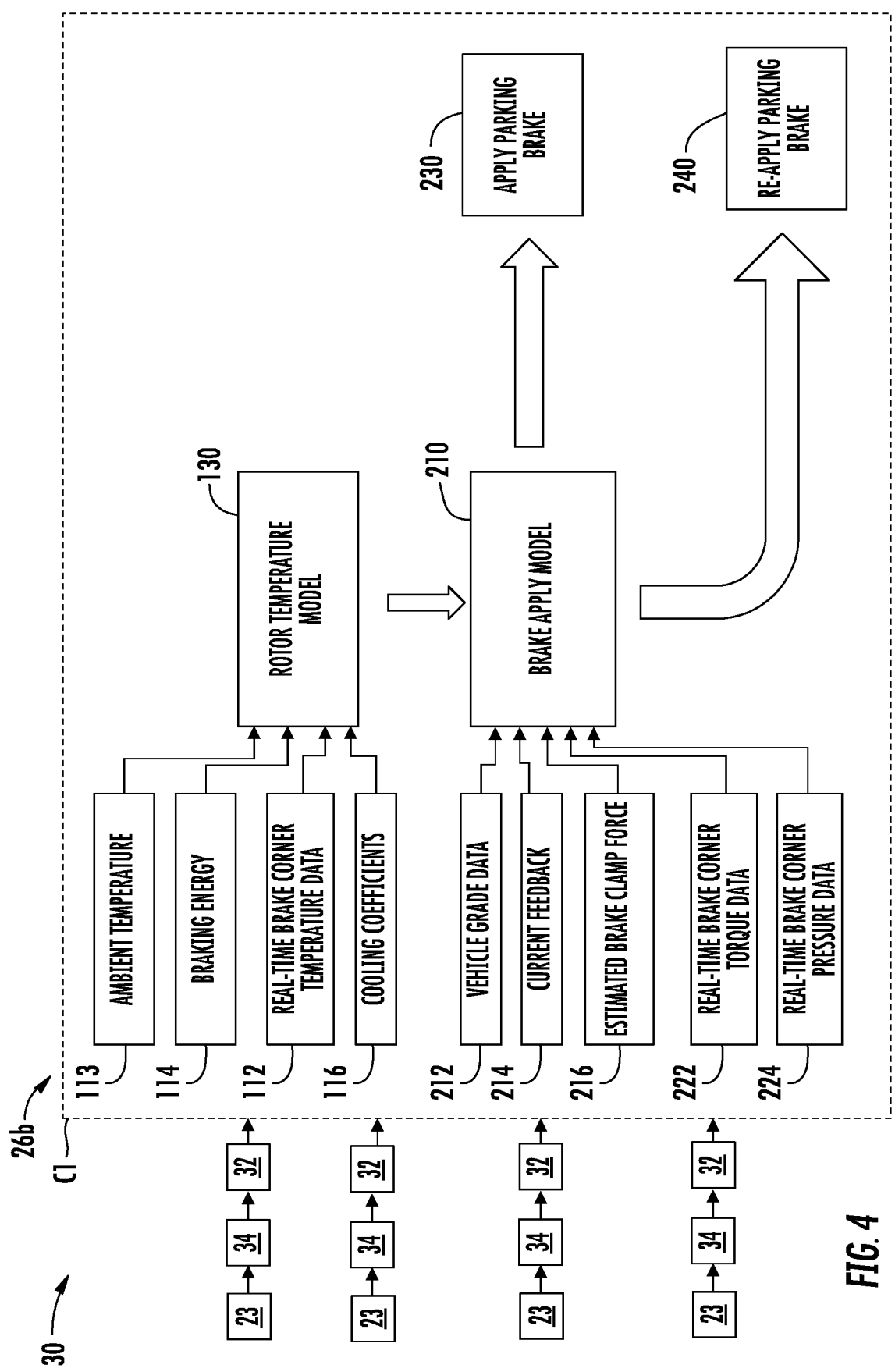
FIG. 4 is a block chart diagram illustrating a second algorithm of determining re-clamp of a parking brake pad, according to an embodiment of the present disclosure.

Referring to FIG. 4, with continued reference to FIG. 1, a system 30 for determining whether a brake corner 21 needs to be re-clamped is illustrated, in accordance with an embodiment of the present disclosure. The system 30 on the vehicle 10 includes various vehicle sensors 32, and includes the controller C1 that receives input signals from the sensors 32 so that the processor 24 can carry out the second algorithm 26b, represented as various modules each modeling aspects of the vehicle operation based on the sensor inputs, to produce an alert in a brake state of health output device 35, such as an operator display device or an audio signal. Although only four sensors 32 are depicted, many more sensors may be included in the system 30. The sensors 32 may include wheel speed sensors, brake fluid pressure sensors, and other sensors and the input from the sensors 32 may include wheel speeds, vehicle speed, longitudinal acceleration, dynamic brake proportioning, brake apply, vehicle grade, brake temperature (brake pad, or brake fluid), brake apply sensor (BAS), steering wheel input, and brake pad life status signal (a voltage reading from a wearout sensor with a resistive circuit). Additionally, the sensor 23 of the brake corner 21 also provides data to the controller C1. Various systems 34 may provide input signals, including vehicle systems and offboard systems, such as telematics systems, global positioning systems, and map information. Based on the input from the sensors 32 and systems 34, the controller C1 can estimate or calculate vehicle mass, road grade, amount of engine braking, braking energy, rolling resistance, appropriate rotor cooling coefficients, lateral and longitudinal acceleration, and other vehicle operating characteristics as described herein.

It should be appreciated that the electronic controller C1 may be configured as a single or a distributed control device that is electrically connected to or otherwise placed in hard-wired or wireless communication with the engine E1 or electric motors (for BEV/Hybrid), the transmission T1, the braking system 16, and various vehicle components, including sensors, for transmitting and receiving electrical signals for proper execution of the second algorithm 26b.

The electronic controller C1 includes one or more control modules, with one or more processors 24 and tangible, non-transitory memory, e.g., read-only memory (ROM), whether optical, magnetic, flash, or otherwise. The electronic controller C1 may also include sufficient amounts of random access memory (RAM), electrically-erasable programmable read-only memory (EEPROM), and the like, as well as a high-speed clock, analog-to-digital (A/D) and digital-to-analog (D/A) circuitry, and input/output circuitry and devices (I/O), as well as appropriate signal conditioning and buffer circuitry.

The electronic controller C1 can be a host machine or a distributed system, e.g., a computer such as a digital computer or microcomputer, acting as a vehicle control module, and/or as a proportional-integral-derivative (PID) controller device having a processor, and, as the memory, tangible, non-transitory computer-readable memory such as read-only memory (ROM) or flash memory. Therefore, the controller C1 can include all software, hardware, memory, algorithms, connections, sensors, etc., necessary to monitor the vehicle 10 and control the system 30. As such, one or more control methods executed by the controller C1 can be embodied as software or firmware associated with the controller C1. It is to be appreciated that the controller C1 can also include any device capable of analyzing data from various sensors, comparing data, and making decisions required to determine whether to re-clamp a parking brake is required. Moreover, the electronic controller C1 can be configured in different embodiments to include a brake controller, a powertrain controller, and other controllers onboard or offboard the vehicle 10.

The second algorithm 26b determines rotor temperature according to a rotor temperature model 130. The real-time brake corner temperature data 112 is measured at a certain offset from the rotor 20 (e.g., this may be a brake pad lining thickness if measured behind the liner), and as such requires a small thermal calculation to take place in order to determine the true temperature on the rotor 20. If the sensor 23 is using a thermocouple embedded in the brake pad 22 to detect real-time brake corner temperature data 112, the detected real-time brake corner temperature data 112 is correlated to the thickness of the lining and the cooling effects between the rotor 20 and brake pad 22 interface, which is subject to speed of vehicle 10 and aero coefficients. Thus, the real-time brake corner temperature data 112 may not be the actual temperature of the rotor 20, but rather may be less than the actual temperature of the rotor 20.

The rotor temperature model 130 utilizes real-time brake corner temperature data 112, ambient temperature 113, and the braking energy 114. The braking energy 114 may be determined as discussed herein in relation to FIG. 2. As discussed, the sensor 23 within the brake corner 21 detects in real-time the temperature of the brake corner 21. The rotor temperature model 130 also factors into account a first set of cooling coefficients 116 for a thermal temperature model of the brake corner 21. The calculated braking energy 114 and cooling coefficients 116 are appropriate (i.e., substantially accurate) for vehicle operating conditions with relatively low energy braking, typical of standard driving conditions. Accordingly, the first rotor temperature model 130 utilizes a calculated braking energy 114 and an equation for heat transfer from each rotor 20 that utilizes cooling coefficients 116 selected to correlate with the standard driving conditions.

The cooling rate of the rotors 20 is dependent on the mass of the rotor 20, vehicle design, vehicle speed, wheel speed, ambient temperature, altitude, etc. As the vehicle 10 moves, the air flowing around each rotor 20 will determine how fast it is cooled from the previous braking event. The cooling coefficients 116 used in the lumped capacitance model of temperature decay (Equation 9) are selected to be correlated with relatively standard driving conditions with rotor temperature below a predetermined rotor temperature, vehicle speed below a predetermined vehicle speed, and braking energy below a predetermined braking energy.

The lumped capacitance model for brake rotor cooling is as follows:

$$\frac{dT}{dt} = -b(T - T_a) + D(1) \quad (9)$$

$$D = \frac{P_d}{\rho V_c} \quad (10)$$

where $P_d$ is brake residual drag, $\rho$ is the density of the rotor material, V is the volume of the rotor material, and c is the specific heat capacity of the rotor material. The term b is the "cooling coefficient" and is equal to:

$$\frac{hA}{\rho V_c} \quad (11)$$

where h is the convective heat transfer coefficient and A is the working area (exposed to convective cooling airflow). Cooling coefficients are measured in vehicle tests by recording the cooling rate of the brake rotors and fitting the lumped capacitance model to the recorded data. Cooling coefficients vary approximately linearly with vehicle speed. Cooling coefficients may be measured at discrete speeds, and may then a linear model may be fit to the data to determine cooling coefficients at any speed. Typical cooling coefficient values will vary by brake rotor design and vehicle environment. An example cooling coefficient versus vehicle speed relationship could be:

$$b = 0.00033V + 0.0033 \quad (12)$$

where V is the vehicle forward velocity in kilometers per hour. In the case of a parked vehicle 10 then V would equal zero. The calculated rotor temperature determined by the rotor temperature model 130 is then passed to the brake apply model 210.

After an estimated rotor temperature is provided using the standard rotor temperature model 130, the second algorithm 26b then proceeds to the vehicle brake apply model 210. The brake apply model 210 is configured to determine a force to apply the parking brake in response to vehicle grade data 212, current feedback 214, estimated brake clamp force 216, real-time brake corner torque data 222, and real-time brake corner pressure data 224. The estimated brake clamp force 216 may be a real time output of the real-time brake corner pressure data 224. The current feedback 214 is an electrical motor current for a motor-on-caliper park brake actuator. The data is consumed to determine estimated brake clamp force 216 currently, and this estimated brake clamp force 216 is refined with real time clamp data. The brake apply model 210 is the combined algorithm, which will look at motor current data, temperature data, vehicle grade data and real time clamp force data to determine the appropriate threshold to provide a park brake reapply, if needed. The brake apply model 210 may determine that a re-clamp is required after a time period in response to the real-time brake corner temperature 112, the estimated brake clamp force 216, and cooling coefficients 116 of the brake corner 21.

The brake apply model 210 is configured to monitor real-time brake corner torque data 222 and real-time pressure data 224 utilizing the sensor 23 of the brake corner 21. The real-time brake corner torque data 222 and real-time pressure data 224 may be captured at a selected sampling rate such as, for example, 20 ms. The brake apply model 210 is configured to determine whether the parking brake is required at 230 and whether re-clamp of the electric parking brake is required in response to the real-time brake corner torque data 222 and real-time pressure data 224. If re-clamp of the electric parking brake is required then the brake apply model 210 will re-apply the electric parking brake at 240. Advantageously, the brake apply model 210 may be utilized to detect conditions that might lead to a roll-away of the vehicle 10 and re-clamp the electric parking brake before roll away were to occur.

Figure 5:
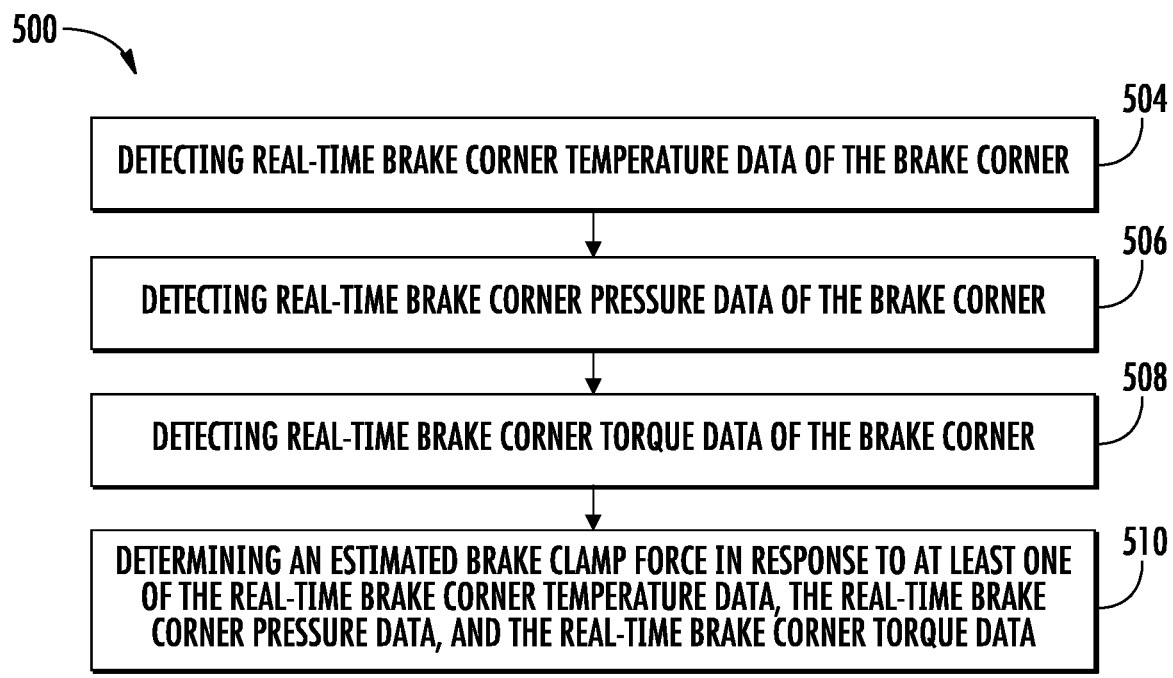
FIG. 5 is a flow diagram illustrating a method of monitoring brake pads to determine re-clamp of the parking brake pad, according to an embodiment of the present disclosure.

Referring to FIG. 5, with continued reference to FIGS. 1 and 4, a flow chart is illustrated of a method 500 of monitoring brake corners 21 of a vehicle 10, according to an embodiment of the present disclosure. In an embodiment, the method 500 is performed by the controller C1.

At block 504, real-time brake corner temperature data 112 of the brake corner 21 is detected. At block 506, real-time brake corner pressure data 224 of the brake corner 21 is detected. At block 508, real-time brake corner torque data 222 of the brake corner 21 is detected. At block 510, an estimated brake clamp force 216 is determined in response to at least one of the real-time brake corner temperature data 112, the real-time brake corner pressure data 224, and the real-time brake corner torque data 222.

The method 500 may also include that the brake corner 21 is clamped using the estimated brake clamp force 216. After the brake corner 21 is clamped, real-time brake corner temperature data 112 of the brake corner 21, real-time brake corner pressure data 224 of the brake corner 21, and real-time brake corner torque data 222 of the brake corner 21 may be continuously detected. After the brake corner 21 is clamped, it may be determined whether a re-clamp is required in response to at least one of the real-time brake corner temperature data 112, the real-time brake corner pressure data 224, and the real-time brake corner torque data 222. If it is determined that a re-clamp of the brake corner 21 is required, then a second estimated brake clamp force 216 may be determined in response to at least one of the real-time brake corner temperature data 112, the real-time brake corner pressure data 224, and the real-time brake corner torque data 222. Then the brake corner 21 may be re-clamped using the estimated brake clamp force 216.

The method 500 may further include that a re-clamp may be determined to be required after a time period in response to the real-time brake corner temperature 112, the estimated brake clamp force 216, and cooling coefficients 116 of the brake corner 21.

While the above description has described the flow process of FIG. 5 in a particular order, it should be appreciated that unless otherwise specifically required in the attached claims that the ordering of the steps may be varied.

Figure 6:
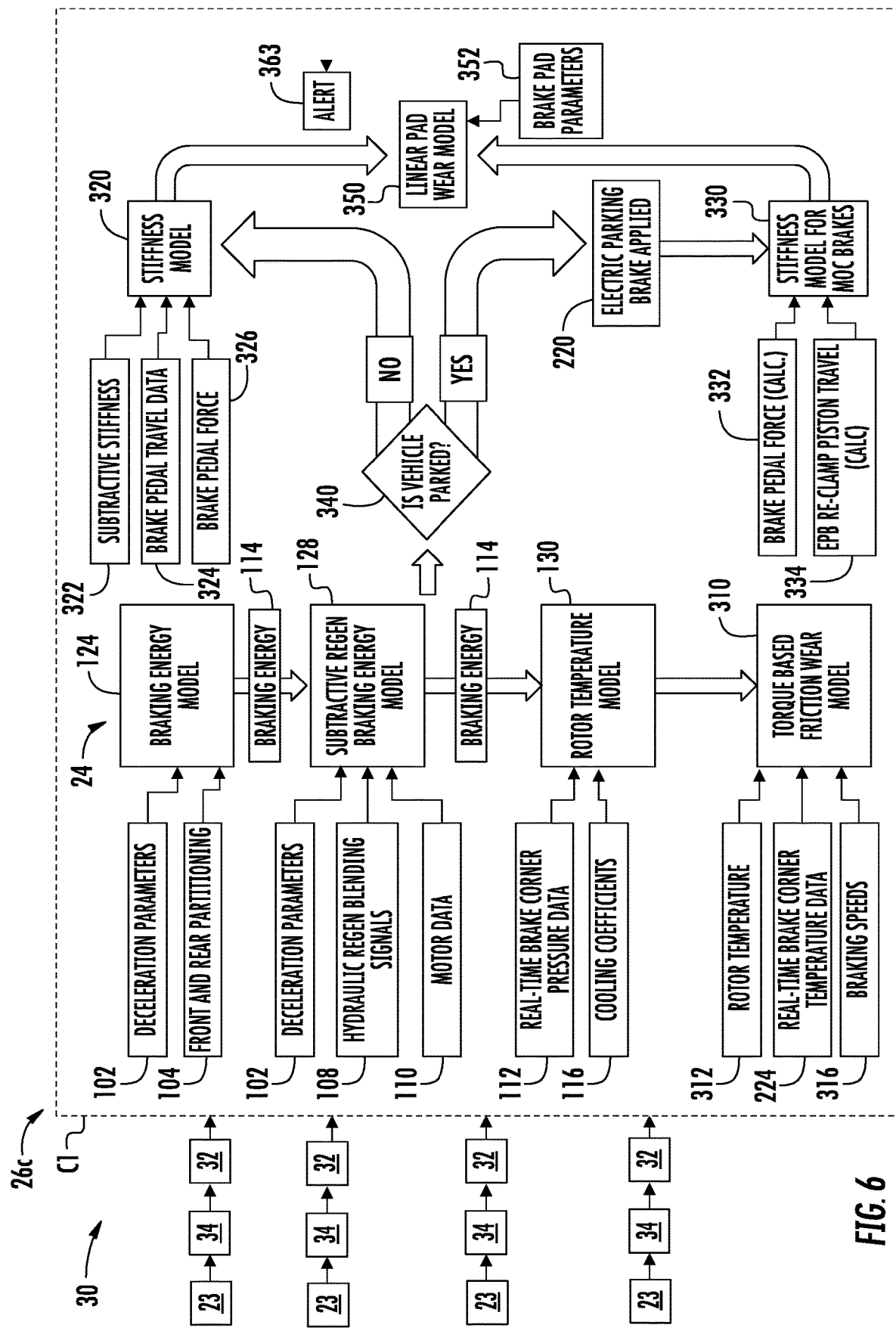
FIG. 6 is a block chart diagram illustrating a third algorithm of determining a remaining life of the brake pad, according to an embodiment of the present disclosure.

Referring to FIG. 6, with continued reference to FIG. 1, a system 30 for brake pad life monitoring is illustrated, in accordance with an embodiment of the present disclosure. The system 30 on the vehicle 10 includes various vehicle sensors 32, and includes the controller C1 that receives input signals from the sensors 32 so that the processor 24 can carry out the third algorithm 26c, represented as various modules each modeling aspects of the vehicle operation based on the sensor inputs, to produce an alert 363 in a brake state of health output device 35, such as an operator display device or an audio signal. Although only four sensors 32 are depicted, many more sensors may be included in the system 30. The sensors 32 may include wheel speed sensors, brake fluid pressure sensors, and other sensors and the input from the sensors 32 may include wheel speeds, vehicle speed, longitudinal acceleration, dynamic brake proportioning, brake apply, vehicle grade, brake temperature (brake pad, or brake fluid), brake apply sensor (BAS), steering wheel input, and brake pad life status signal (a voltage reading from a wearout sensor with a resistive circuit). Additionally, the sensor 23 of the brake corner 21 also provides data to the controller C1. Various systems 34 may provide input signals, including vehicle systems and offboard systems, such as telematics systems, global positioning systems, and map information. Based on the input from the sensors 32 and systems 34, the controller C1 can estimate or calculate vehicle mass, road grade, amount of engine braking, braking energy, rolling resistance, appropriate rotor cooling coefficients, lateral and longitudinal acceleration, and other vehicle operating characteristics as described herein.

It should be appreciated that the electronic controller C1 may be configured as a single or a distributed control device that is electrically connected to or otherwise placed in hard-wired or wireless communication with the engine E1 or electric motors (for BEV/Hybrid), the transmission T1, the braking system 16, and various vehicle components, including sensors, for transmitting and receiving electrical signals for proper execution of the third algorithm 26c.

The electronic controller C1 includes one or more control modules, with one or more processors 24 and tangible, non-transitory memory, e.g., read-only memory (ROM), whether optical, magnetic, flash, or otherwise. The electronic controller C1 may also include sufficient amounts of random access memory (RAM), electrically-erasable programmable read-only memory (EEPROM), and the like, as well as a high-speed clock, analog-to-digital (A/D) and digital-to-analog (D/A) circuitry, and input/output circuitry and devices (I/O), as well as appropriate signal conditioning and buffer circuitry.

The electronic controller C1 can be a host machine or a distributed system, e.g., a computer such as a digital computer or microcomputer, acting as a vehicle control module, and/or as a proportional-integral-derivative (PID) controller device having a processor, and, as the memory, tangible, non-transitory computer-readable memory such as read-only memory (ROM) or flash memory. Therefore, the controller C1 can include all software, hardware, memory, algorithms, connections, sensors, etc., necessary to monitor the vehicle 10 and control the system 30. As such, one or more control methods executed by the controller C1 can be embodied as software or firmware associated with the controller C1. It is to be appreciated that the controller C1 can also include any device capable of analyzing data from various sensors, comparing data, and making decisions required to monitor brake pad wear and alert the vehicle operator of brake pad life. Moreover, the electronic controller C1 can be configured in different embodiments to include a brake controller, a powertrain controller, and other controllers onboard or offboard the vehicle 10.

The third algorithm 26c begins by determining braking energy 114 according to a braking energy model 124. The calculated braking energy 114 used in the rotor temperature model 130 is an estimate of the braking energy dissipation in the braking mechanisms 18A, 18B, 18C, 18D. This calculation uses various inputs, such as stopping distance, stopping time, brake pad temperature, etc. The master cylinder pressure of the braking system 16, the weight distribution in the vehicle 10 and the dynamic brake proportioning for the proportional brake pressure at each wheel 14A-14D can be used to determine the brake pressure. The front and rear brake partitioning 104 is based on where the weight in the vehicle 10 is distributed, and is a known calculation. Vehicle mass can be estimated based on engine torque, and is a process well known to those skilled in the art. The mass of the vehicle 10 may change as a result of the number of passengers, load in the trunk, fuel capacity, etc. Further, those skilled in the art understand various ways to estimate the road grade in combination with the estimation of the vehicle mass.

The processor 24 can calculate the braking energy 114 for use in the rotor temperature model 130 by Equation (13) below. The braking energy 114 is the work done by the braking mechanisms 18A-18D to decelerate the vehicle 10, and is the total work minus the rolling resistance, the aerodynamic drag, the engine braking and the road grade. The brake work can be used to calculate the power dissipated by the braking mechanisms 18A, 18B, 18C, 18D, where power equals work per unit of time. The power can be calculated at predetermined time intervals during the braking event, for example, every 10 milliseconds.

$$\text{Braking Energy} = \frac{1}{2}M(V_1^2 - V_F^2) - E_{Rolling\ Resistance} - E_{Grade} - E_{Engine} \qquad (13)$$

In Equation (13), M is the mass of the vehicle; $E_{Rolling\ Resistance}$ is the energy required to roll the vehicle 10 on a flat grade, which is a known value; $E_{Grade}$ is the energy required to roll the vehicle 10 as a result of the grade of the road, which is also a known value; $E_{Engine}$ is the braking provided by the engine E1 itself, and is also a known value; $V_1$ is the velocity of the vehicle 10 at the beginning of the braking event; and $V_F$ is the velocity of the vehicle 10 at the end of the braking event. In an alternate embodiment, vehicle 10 deceleration parameters 102 can be used instead of the vehicle speed V, and can be provided by a longitudinal acceleration sensor.

The total braking power dissipated by each brake corner 21 during the braking event can also be estimated as the product of braking force and vehicle velocity. Braking torque can be calculated as:

$$\text{Braking Torque} = \text{brake pressure} \times \text{area} \times \mu \qquad (14)$$

Where $\mu$ is the friction coefficient of the brake pad 22, which is a function of the pad temperature, and area is the area of the hydraulic piston(s) in the brake corner 21. Braking energy may be an average braking power multiplied by stopping time. Alternately, the braking power can be calculated as:

$$\text{Braking Power} = \left(\frac{\text{Torque}}{\text{Rolling Radius}}\right) * \text{Velocity} \qquad (14)$$

The torque is calculated for both the front and the rear of the vehicle 10 and is a function of the brake pressure and the front and rear brake partitioning 104. The Rolling Radius is the rolling radius of the wheel 14A, 14B, 14C, or 14D, and velocity is the vehicle velocity.

The processor 24 can then adjust the braking energy 114 for use in the rotor temperature model 130 using the subtractive regen braking energy model 128. The subtractive regen braking energy model 128 adjusts the braking energy 114 in response to motor data 110, hydraulic regen blending signals 108, and deceleration parameters 102. The subtractive regen braking energy 128 model is utilized for hybrid or battery electric vehicles due to regenerative braking energy that is generated during a braking event. This energy contributes to the overall stopping energy of the vehicle and is a separate system that has no physical effect on the hardware at the brake corner 21 (i.e., the rotors, calipers, brake pads, etc). Regen braking takes some "load" off of the friction brake corners 21. The subtractive regen braking energy model 128 can be refined with inputs from the regen braking system, to see how much energy should be "subtracted". If the hydraulic pressure at the brake corner 21 is known, the friction braking energy is directly calculable.

The third algorithm 26c determines rotor temperature according to a rotor temperature model 130. The real-time brake corner temperature data 112 is measured at a certain offset from the rotor 20 (e.g., this may be a brake pad lining thickness if measured behind the liner), and as such requires a small thermal calculation to take place in order to determine the true temperature on the rotor 20. If the sensor 23 is using a thermocouple embedded in the brake pad 22 to detect real-time brake corner temperature data 112, the detected real-time brake corner temperature data 112 is correlated to the thickness of the lining and the cooling effects between the rotor 20 and brake pad 22 interface, which is subject to speed of vehicle 10 and aero coefficients. Thus, the real-time brake corner temperature data 112 may not be the actual temperature of the rotor 20, but rather may be less than the actual temperature of the rotor 20.

The rotor temperature model 130 utilizes real-time brake corner temperature data 112 and the braking energy 114 determined by the braking energy model 124 and adjusted by the subtractive regen braking energy model 128. As discussed above, the sensor 23 within the brake corner 21 detects in real-time the temperature of the brake corner 21. The rotor temperature model 130 also factors into account a first set of cooling coefficients 116 for a thermal temperature model of the brake corner 21. The calculated braking energy 114 and cooling coefficients 116 are appropriate (i.e., substantially accurate) for vehicle operating conditions with relatively low energy braking, typical of standard driving conditions. Accordingly, the first rotor temperature model 130 utilizes a calculated braking energy 114 and an equation for heat transfer from each rotor 20 that utilizes cooling coefficients 116 selected to correlate with the standard driving conditions.

The cooling rate of the rotors 20 is dependent on the mass of the rotor 20, vehicle design, vehicle speed, wheel speed, ambient temperature, altitude, etc. As the vehicle 10 moves, the air flowing around each rotor 20 will determine how fast it is cooled from the previous braking event. The cooling coefficients 116 used in the lumped capacitance model of temperature decay (Equation 16) are selected to be correlated with relatively standard driving conditions with rotor temperature below a predetermined rotor temperature, vehicle speed below a predetermined vehicle speed, and braking energy below a predetermined braking energy.

The lumped capacitance model for brake rotor cooling is as follows:

$$\frac{dT}{dt} = -b(T - T_a) + D(1) \qquad (16)$$

$$D = \frac{P_d}{\rho V_c} \qquad (17)$$

where $P_d$ is brake residual drag, $\rho$ is the density of the rotor material, V is the volume of the rotor material, and c is the specific heat capacity of the rotor material. The term b is the "cooling coefficient" and is equal to:

$$\frac{hA}{\rho V_c} \qquad (18)$$

where h is the convective heat transfer coefficient and A is the working area (exposed to convective cooling airflow). Cooling coefficients are measured in vehicle tests by recording the cooling rate of the brake rotors and fitting the lumped capacitance model to the recorded data. Cooling coefficients vary approximately linearly with vehicle speed. Cooling coefficients may be measured at discrete speeds, and may then a linear model may be fit to the data to determine cooling coefficients at any speed. Typical cooling coefficient values will vary by brake rotor design and vehicle environment. An example cooling coefficient versus vehicle speed relationship could be:

$$b = 0.00033 V + 0.0033 \qquad (19)$$

where V is the vehicle forward velocity in kilometers per hour.

After an estimated rotor temperature is provided using the standard rotor temperature model 130, the third algorithm 26c then proceeds to the torque based friction model 310, which utilizes rotor temperature 312, real-time torque/pressure data 224, and braking speeds 316. The torque based friction model 310 is configured to provide a measure brake pad stiffness change over time, which offers a discreet measurement of the pad thickness.

As described above, the real-time brake sensor data (e.g., real-time brake corner pressure data 224 (effectively, clamp force), real-time brake corner temperature data 112, real-time brake corner torque data 222) allows a stiffness of the brake pad 22 to be back calculated. The brake pad 22 stiffness and remaining pad friction thickness are directly related. If stiffness is known, thickness can be calculated.

At block 340, the third algorithm 26c checks whether the brake pedal is not applied and then moves to either the stiffness model 320 or the ERP re-clamp model 220. If the vehicle is not in park at block 340 then the third algorithm 26c moves to the stiffness model 320. The stiffness model 320 determines a stiffness of the brake pad 22 in in response to at least one of subtractive stiffness calculations 322 (discussed further below), brake pedal travel data 324, and brake calculation 326. The stiffness of the brake pad 22 determined by the stiffness model 320 is then transmitted to the linear pad wear model 350.

If the vehicle is in park at block 340 then the electric parking brake is applied at block 220 and the third algorithm 26c moves to the stiffness model for motor on caliper (MOC) brakes 330.

The stiffness model for MOC brakes 220 is configured to determine a stiffness of the brake pad 22 in response to the brake pedal force 332 and the electric parking brake re-clamp piston travel 334 and pass this along to the stiffness model for MOC brakes 330. The linear pad wear model 350 is configured to determine a thickness of the brake pad 22 in response to the brake pad parameters and the stiffness of the brake pad 22 determined by the stiffness model 320 and/or the stiffness model for MOC brakes 330. The brake pad parameters 352 may include, but is not limited to, an elastic modulus of the friction material of the brake pad 22, an area of the brake pad 22, and an area of a rotor 20. The thickness of the brake pad 22 is calculated as the relationship of the elastic modulus of the friction material of the brake pad 22 and the displacement required to generate a known clamp force. A relationship can be generated based on brake pedal position, which may be used by the stiffness model 320 to calculate how much linear displacement of the front and rear caliper pistons results. This, however, may not allow the front and rear axle brake pad 22 wear to be differentiated, as the brake corner 21 designs are different between the front and rear axles. When a MOC park brake is used on one axle (typically the rear), a separate stiffness/travel relationship can be established from the motor actuator apply during a park scenario. The park brake axle pad wear can be calculated by the stiffness model for MOC brakes 330 (i.e., stiffness model for the park brakes), then subtracted from the "total" calculation derived from brake pedal position by the stiffness model 320 to determine the other axle that does not have the park brake.

The linear pad wear model 350 is configured to activate an alert 363 if the pad thickness is below a selected threshold. The alert 363 may be delivered via the brake pad state of health output device 35. The alert 363 may be a message to the driver via an instrument cluster message, center stack message, or telltale indicator light. In the case of autonomous driving the alert 363 may trigger an automatic service check.

Figure 7:
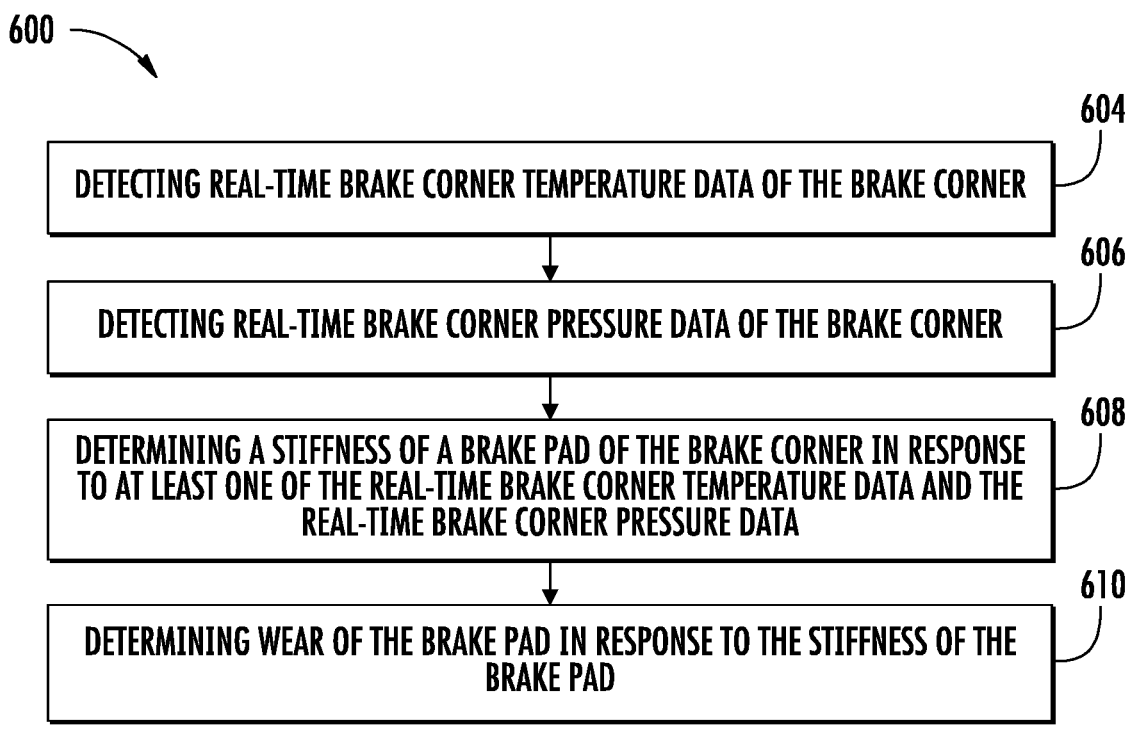
FIG. 7 is a flow diagram illustrating a method of monitoring brake pads to determine the remaining life of the brake pad, according to an embodiment of the present disclosure.

Referring to FIG. 7, with continued reference to FIGS. 1 and 6, a flow chart is illustrated of a method 600 of monitoring brake corners of a vehicle 10, according to an embodiment of the present disclosure. In an embodiment, the method 600 is performed by the controller C1.

At block 604, real-time brake corner temperature data 112 of the brake corner 21 is detected. At block 606, real-time brake corner pressure data 224 of the brake corner 21 is detected. At block 608, a stiffness of a brake pad 22 of the brake corner 21 is detected in response to at least one of the real-time brake corner temperature data 112 and the real-time brake corner pressure data 224. Determining the stiffness of the brake pad 22 may include determining braking energy 114 of the brake corner 21. Braking energy 114 is determined in response to deceleration parameters 102 of the vehicle 10. The braking energy 114 may be adjusted in response aerodynamic losses of the vehicle 10 and the real-time brake corner temperature data 112. At block 610, wear of the brake pad 22 is determined in response to the stiffness of the brake pad 22.

An alert 363 may be activated when the wear of the brake pad 22 exceeds a brake pad wear exceedance limit. The sampling rate may be increased of at least one of the real-time brake corner temperature data 112 and the real-time brake corner pressure data 224 when the wear of the brake pad 22 exceeds a brake pad wear exceedance limit.

While the above description has described the flow process of FIG. 7 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes a device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of monitoring a brake corner of a vehicle, the method comprising:
   detecting real-time brake corner temperature data of the brake corner;
   detecting real-time brake corner pressure data of the brake corner;
   determining a stiffness of a brake pad of the brake corner based on the real-time brake corner temperature data and the real-time brake corner pressure data; and
   determining wear of the brake pad based on the stiffness of the brake pad,
   wherein determining the stiffness of the brake pad of the brake corner based on at least one of the real-time brake corner temperature data and the real-time brake corner pressure data further comprises:
   determining that the vehicle is in motion while the vehicle is in motion;
   detecting a stiffness of multiple brake pads of the vehicle when the vehicle is in motion, the multiple brake pads comprising a first group of brake pads located on a first axle of the vehicle having a parking brake and a second group of brake pads located on a second axle of the vehicle not having a parking brake;

determining that the vehicle is parked once the vehicle is no longer in motion;

detecting a stiffness of the first group of brake pads when the vehicle is parked; and subtracting the stiffness of the first group of brake pads from the stiffness of the multiple brake pads.

2. The method of claim 1, further comprising activating an alert when the wear of the brake pad exceeds a brake pad wear exceedance limit.

3. The method of claim 1, further comprising increasing the sampling rate of at least one of the real-time brake corner temperature data and the real-time brake corner pressure data when the wear of the brake pad exceeds a brake pad wear exceedance limit.

4. The method of claim 1, wherein determining the stiffness of the brake pad of the brake corner based on at least one of the real-time brake corner temperature data and the real-time brake corner pressure data further comprises determining a braking energy of the brake corner based on the real-time brake corner temperature data of the brake corner.

5. The method of claim 4, wherein determining the braking energy of the brake corner based on the real-time brake corner temperature data of the brake corner further comprises:

determining the braking energy based on deceleration parameters of the vehicle;

adjusting the braking energy based on aerodynamic losses of the vehicle; and adjusting the braking energy based on the real-time brake corner temperature data.

\* \* \* \* \*